United States Patent
Wu et al.

(10) Patent No.: US 7,471,873 B2
(45) Date of Patent: Dec. 30, 2008

(54) METHOD FOR REPAIRING VIDEO/AUDIO FILES OF MULTIMEDIA VIDEO/AUDIO DISKS

(75) Inventors: Kun-Ta Wu, Hsinchu (TW); Meng-Han Tsai, Hsinchu (TW); Guo-Zua Wu, Hsinchu (TW); Jian-Ru Li, Hsinchu (TW); Wei-Zheng Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 864 days.

(21) Appl. No.: 10/844,452

(22) Filed: May 13, 2004

(65) Prior Publication Data

US 2005/0141882 A1 Jun. 30, 2005

(30) Foreign Application Priority Data

Dec. 26, 2003 (TW) .............................. 92137213 A

(51) Int. Cl.
*H04N 5/91* (2006.01)
*H04N 9/88* (2006.01)

(52) U.S. Cl. ............................................ 386/68; 386/2

(58) Field of Classification Search ...................... 386/2, 386/21, 47, 68, 6–7, 76, 116, 113
See application file for complete search history.

(56) References Cited

U.S. PATENT DOCUMENTS 5,870,523 A * 2/1999 Kikuchi et al. ................ 386/95
6,580,872 B1 * 6/2003 Kikuchi et al. ................ 386/95

* cited by examiner

*Primary Examiner*—Thai Q. Tran
*Assistant Examiner*—Tat Chi Chio
(74) *Attorney, Agent, or Firm*—Birch, Stewart, Kolasch & Birch, LLP

(57) ABSTRACT

A method for repairing video/audio files of multimedia video/audio disks is provided. The disclosed method may repair the fields with errors in the video/audio files after recording by utilizing the rewritable characteristic of rewritable optical disks. The errors caused by the video/audio instantaneous editing and recording platform may be reduced according to the disclosed method such that the repaired films may play fast forward/backward smoothly, perform Time Search function accurately, and display presentation time correctly, and are compatible to players of different specifications.

27 Claims, 9 Drawing Sheets

METHOD FOR REPAIRING VIDEO/AUDIO FILES OF MULTIMEDIA VIDEO/AUDIO DISKS

This Non-provisional application claims priority under 35 U.S.C. §119(a) on Patent Application No(s). 092137213 filed in Taiwan on Dec. 26, 2003, the entire contents of which are hereby incorporated by reference.

BACKGROUND OF THE INVENTION

1. Field of Invention

The invention relates to a data-repairing method for an optical disk, and more particularly to a method for repairing the DVD video/audio defects generated in the DVD instantaneous video/audio editing and recording system.

2. Related Art

The DVD-Video Mode and DVD-Video RM Mode files recorded through various kinds of DVD instantaneous video/audio editing and recording platforms generate some problems, such as 'error fast forward play', and 'error play time displaying'. This is because correct values can not filled into the specific columns in Presentation Control Information (PCI) and Data Search Information (DSI) of the Navigation Pack of Video Object Sets (VOBS) of DVD video/audio files.

For example, the end presentation time of video object unit (VOBU_E_PTM, End PTM of VOBU) and sequence end presentation time of video object units (VOBU_SE_E_PTM, End PTM of sequence end in VOBU) in PCI General Information Table (PCI_GI) in Presentation Control Information (PCI), record end presentation time. These two fields inform the DVD decoder of end presentation time.

For Data Search Information (DSI), errors occur in the DSI General Information Table (DSI_GI), such as end address of VOBU (VOBU_EA), end address of the first Reference Picture in VOBU (VOBU_1STREF_EA), end address of the second Reference Picture in VOBU (VOBU_2NDREF_EA), and end address of the third Reference Picture in VOBU (VOBU_3RDREF_EA). The recorded addresses are not the same because of different length of each VOBU. Therefore, the fast forward or search function cannot perform normally in un-compatible players.

The values in these fields cannot be obtained in advance and be controlled in the decoding hardware and software in the instantaneous editing and recording platform. Different pictures and audios result in inconsistent pack length of the whole VOBU. These values are not obtained until the whole VOBU or VOB are finished editing.

Two solutions solve these technology bottlenecks. The first solution is using buffers. A large buffer is created to accommodate video/audio data upon the instantaneous editing and recording of the rewritable disks. Therefore, the navigation pack sector is reserved in the beginning. The navigation pack is generated after the video pack and the audio pack are recorded to a predetermined volume, and the navigation pack sector is filled into the reserved area.

The aforementioned method is feasible for VOBU_E_PTM, VOBU_E_PTM, VOBU_1STREF_EA, VOBU_2NDREF_EA, VOBU_3RDREF_EA, and VOBU_SE_E_PTM. One VOBU needs about 200 packs (400 KByte), which all the current platforms can reserve. However, for VOBU_SRI, a large buffer of 240 VOBUs (48 M Bytes) is needed, which is not easily to be coordinated among the various editing and recording platforms.

The second solution is to fix the length of each VOBU upon the instantaneous editing and recording of the rewritable disks. Since the length of each VOBU is different, a padding pack is needed to fix the length of each field in VOBU. However, the recordable time reduces. Furthermore, too many padding packs result in video/audio discontinuity and mosaic. Therefore, the second method is not very feasible.

SUMMARY OF THE INVENTION

In view of the aforesaid disadvantages, the primary object of the invention is to provide a method for repairing video/audio files of multimedia video/audio disks, for example, DVD+RW, to solve the problems of fast forwarding and play time display for the films, for example, DVD-Video Mode and DVD+VR Mode, recorded by video/audio editing and recording platform.

Therefore, according to the object of the invention, the method for repairing video/audio files of multimedia video/audio disks, which is used for repairing a fast forward/backward parameter and a presentation time display parameter of a video/audio file recorded by a video/audio instantaneous editing and recording platform, comprises steps of accessing a file system from the video/audio disk and the Video Manager Information and the Video Title Set Information of the file system for obtaining the address of the fast forward/backward parameter and the presentation time display parameter; accessing all the Video Object Units in the video/audio file and the fast forward/backward parameter and the presentation time display parameter that need to be repaired from all the Video Object Units in the video/audio file according to the obtained address; repairing the fast forward/backward parameter and the presentation time display parameter; and repairing the file system according to the repaired fast forward/backward parameter and the repaired presentation time display parameter.

According to the principle of the invention, the disclosed method repairs the fields with errors in the video/audio files after recording, by utilizing the rewritable characteristics of rewritable optical disks. The errors caused by the video/audio instantaneous editing and recording platform are reduced according to the disclosed method such, that the repaired films may play fast forward/backward smoothly, perform Time Search function accurately, and display presentation time correctly, and are compatible to players of different specifications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus doesn't limit the present invention, wherein.

DETAILED DESCRIPTION OF THE INVENTION

According to the method of the invention, the disk drive first accesses all the necessary values of the navigation packs of the VOBS through scanning the whole disk. Then, the drive writes the correct values into the related fields that have incorrect values when performing instantaneous editing and recording. Through the above procedures, the recorded films may play normally, fast forward, backward smoothly and show correct presentation time.

Figure 1:
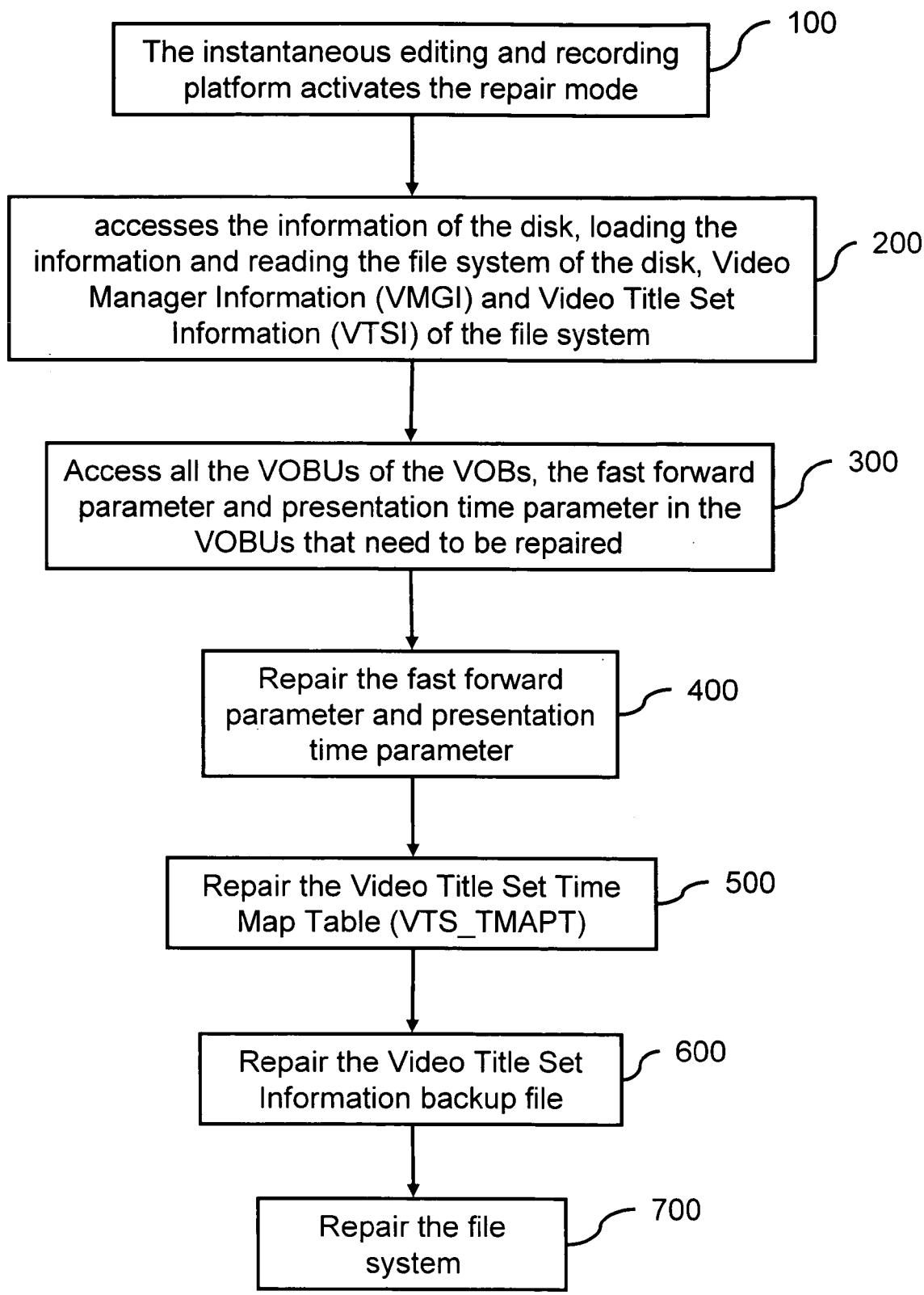
FIG. 1 illustrates the main flow chart of the method for repairing video/audio files of multimedia video/audio disks of the invention.

Please refer to FIG. 1 illustrating the main flow chart of the method for repairing video/audio files of multimedia video/audio disks of the invention. The repair mode is first activated by the instantaneous editing and recording platform after a film is recorded (step 100). The optical disk drive then accesses the information of the disk, loading the information and reading the file system of the disk, Video Manager Information (VMGI) and Video Title Set Information (VTSI) of the file system (step 200), for obtaining the start address and end address of the related fields that need to be repaired. Then, all the VOBUs of the VOBs, the fast forward parameter and presentation time parameter in the VOBUs that need to be repaired are accessed (step 300). The parameters are then repaired (step 400) after being accessed, and the Video Title Set Time Map Table (VTS_TMAPT) is repaired (step 500) following the step of repairing the parameters. Then the Video Title Set Information backup file is repaired (step 600). The file system is repaired in the end (step 700).

The detailed steps of FIG. 1 are described in the following.

Figure 2:
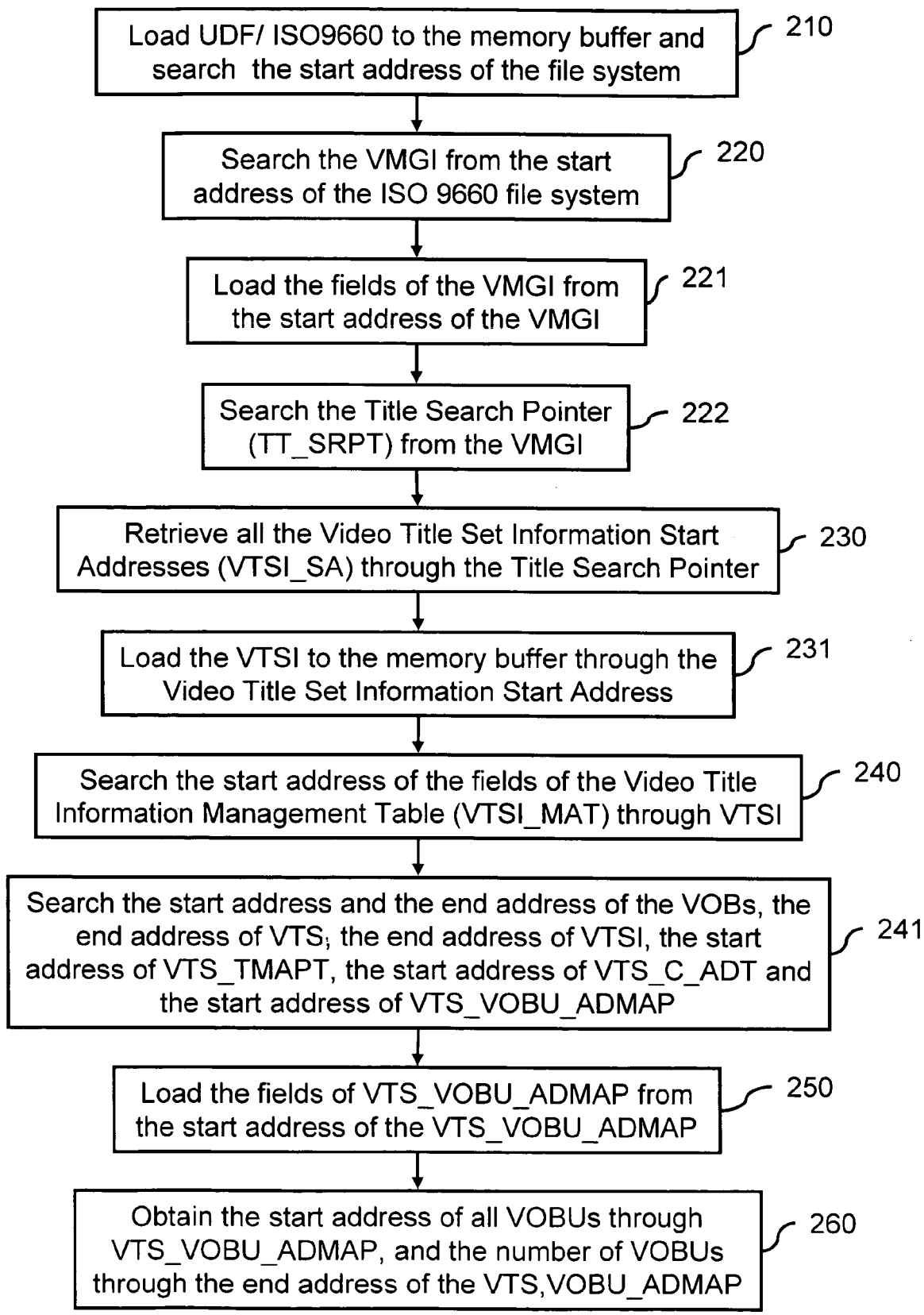
FIG. 2 illustrates the detailed flow chart of accessing file system information in the main flow chart of the method for repairing video/audio files of multimedia video/audio disks of the invention.

Refer to FIG. 2 illustrating the detailed flow chart of accessing file system information in the main flow chart of the method for repairing video/audio files of multimedia video/audio disks of the invention. The UDF/ISO9660 is first loading to the memory buffer (step 210), and the start address of the ISO 9660 file system is then searched. After the start address is obtained, the VMGI is then searched from the start address of the ISO 9660 file system (step 220) for loading the fields of the VMGI to the memory buffer from the disk (step 221). After loading the fields, the Title Search Pointer (TT_SRPT) is then searched from the VMGI (step 222). Through the Title Search Pointer, all the Video Title Set Information Start Addresses (VTSI_SA) are then retrieved (step 230). Finally, the VTSI is loaded to the memory buffer through the Video Title Set Information Start Address (step 231).

After loading the fields of VTSI to the memory buffer, the start address of the fields of the Video Title Information Management Table (VTSI_MAT) is then searched through VTSI (step 240). The start address and the end address of the VOBs, the end address of VTS, the end address of VTSI, the start address of Video Title Set Time Map table (VTS_TMAPT), the start address of Video Title Set Menu Cell Address Table (VTS_C_ADT) and the start address of Video Title Set Video Object Unit Address Map (VTS_VOBU_ADMAP) may be obtained (step 241).

After obtaining the address of VTS_VOBU_ADMAP, the fields of VTS_VOBU_ADMAP are loaded to the memory buffer (step 250). The start address of all VOBUs is obtained through the VTS_VOBU_ADMAP, and the number of VOBUs is also obtained through the end address of the VTS, VOBU_ADMAP (step 260).

The time for searching the parameters of the VOBU that needs to be repaired is reduced through obtaining the start address of VOBU Start Address (VOBU_SA) from the VTS_VOBU_ADMAP. Therefore, the method of the invention speeds up the searching time.

After the start address of all VOBUs are obtained, the parameters of the VOBUs that need to be repaired are then accessed. The parameters that need to be repaired include end presentation time of the VOBU (VOBU_E_PTM) and End PTM of sequence end in the VOBU (VOBU_SE_E_PTM) of a PCI, an end address of VOBU (VOBU_EA), an end address of a VOBU__1STREF (VOBU__1STREF_EA), an end address of a VOBU__2ND REF (VOBU__2NDREF_EA), an end address of a VOBU__3RD REF (VOBU__3RDREF_EA), VOB_V_E_PTM, and VOB_A_STP_PTM.

When moving to the start address of the VOBU, the Navigation Packs are first loaded, and the start presentation time of the VOBU (VOBU_S_PTM) of DSI is accessed. The VOBU_S_PTM of the nth Navigation Pack is equal to the VOBU_E_PTM of the (n−1)th Navigation Pack. Similarly, the VOBU_EA of the nth Navigation Pack is equal to the VOBU_S_PTM of the (n+1)th Navigation Pack. The VOB_SE_E_PTM is equal to VOBU_E_PTM of the last VOBU.

According to rule mentioned above, please refer to FIG. 3 illustrating a detailed flow chart of accessing the parameters needing reparation in the main flow chart of the method for repairing video/audio files of multimedia video/audio disks of the invention. The parameters of VOBs are first accessed (step 310). The parameters include an end presentation time of VOBU (VOBU_E_PTM), end address of VOBU (VOBU_EA), VOBU__1STREF_EA, VOBU__2NDREF_EA, VOBU__3RDREF_EA, and VOB_SE_E_PTM.

The initial value of the buffer index is set to 0 (step 320), and whether all the VOBUs have be accessed by judging whether the current buffer index is smaller than the number of VOBU(step 321). Then the start address of the current VOBU is obtained through a VTS_VOBU_ADMAP field (step 330). The index value of current VOBU is the same as the current buffer index. The final address of the current VOBU is then obtained by subtracting the start address of the next VOBU by 1, i.e., being equal to the end address of the current VOBU, through VTS_VOBU_ADMAP (step 331). After the start address and the end address are obtained, the Navigation Packs are loaded from the start address of the VOBUs (step 332). The start presentation time of the VOBU (VOBU_S_PTM) is then obtained from the PCI/PCI_GI field of the loaded Navigation Pack (step 333). Accordingly, the value of former the VOBU_E_PTM is obtained through the value of the current VOBU_S_PTM (step 334). Then the parameters of DSI are retrieved (step 340). After retrieved, the buffer index is added by I and continues the above steps.

Figure 4:
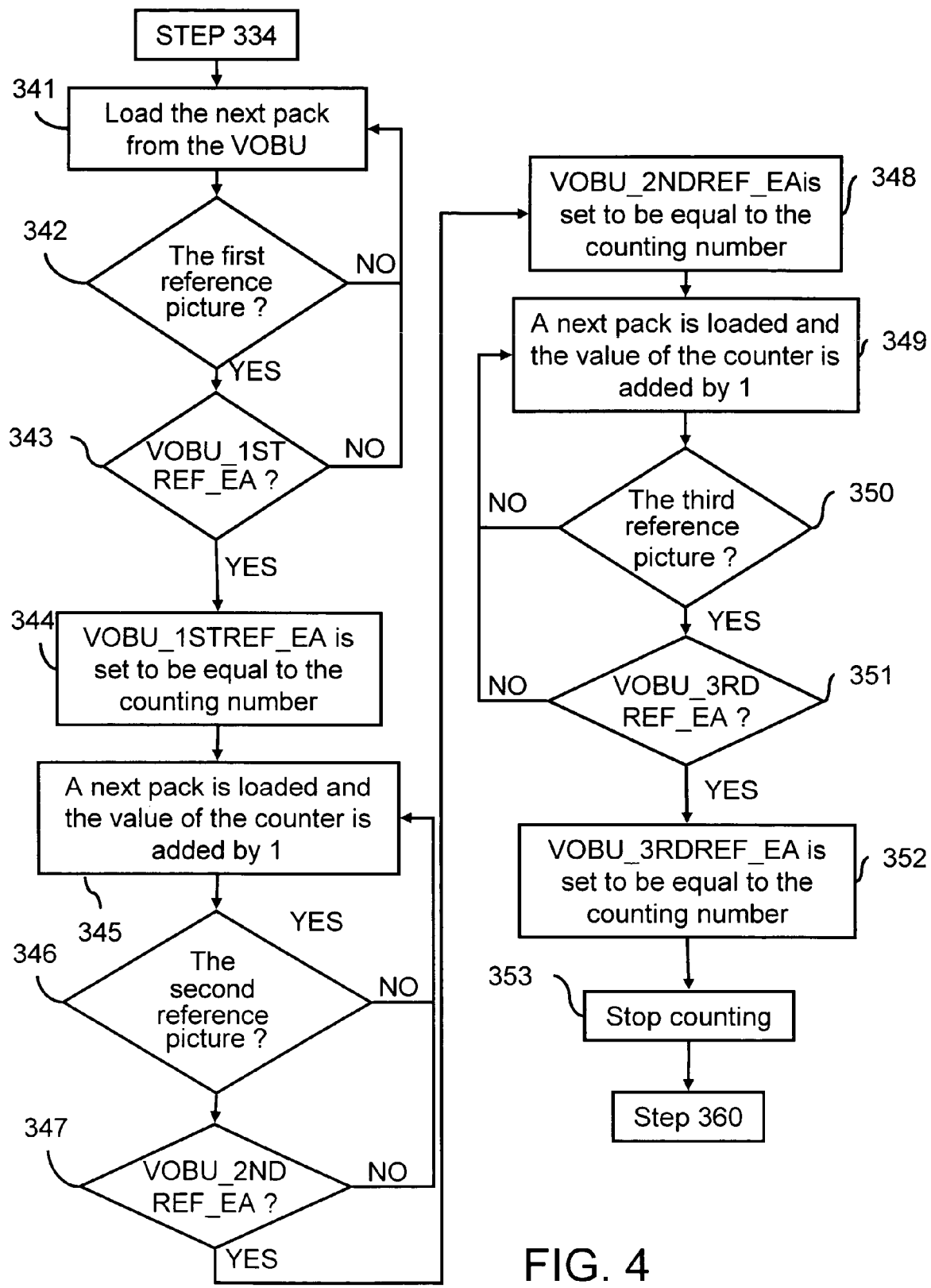
FIG. 4 illustrates the detailed flow chart of accessing the search information parameters in the main flow chart of the method for repairing video/audio files of multimedia video/audio disks of the invention.

Now refer to FIG. 4, illustrating the detailed flow chart of accessing the search information parameters in the main flow-chart of the method for repairing video/audio files of multimedia video/audio disks of the invention. After finishing accessing the VOBU_S_PTM and VOBU_EA, the packs in the VOBUs are loaded to the obtained VOBU_1STREF_EA, VOBU_2NDREF_EA and VOBU_3RDREF_EA in the DSI.

A next pack is loaded from the VOBU (step 341), and then check if the pack is the first reference picture or not (step 342) and the VOBU_1STREF_EA or not (step 343). If it is, the value of the VOBU_1STREF_EA is set to be equal to a counting number (step 344). If it is not, then continue step 341. A next pack is loaded following step 344 (step 345) and the value of the counter is added by 1. Check if the pack is the second reference picture or not (step 346) and the VOBU_2NDREF_EA or not (step 347). If it is, the value of the VOBU_2NDREF_EA is set to be equal to a counting number (step 345). If it is not, then continue step 345. A next pack is loaded following step 345(step 349) and the value of the counter is added by 1. Check if the pack is the third reference picture or not (step 350) and check if the pack the VOBU_3RDREF_EA or not (step 351). If it is not, then continue step 349. If it is, the value of the VOBU_3RDREF_EA is set to be equal to a counting number (step 352) and stop counting. Then counting for the next parameters needing repaired is re-started (step 353). Accordingly, when the VOBU_3RDREF_EA is obtained, the counter stops counting, and the flow re-starts to count for the next parameters that need reparation until all the VOBUs have been accessed.

Figure 3:
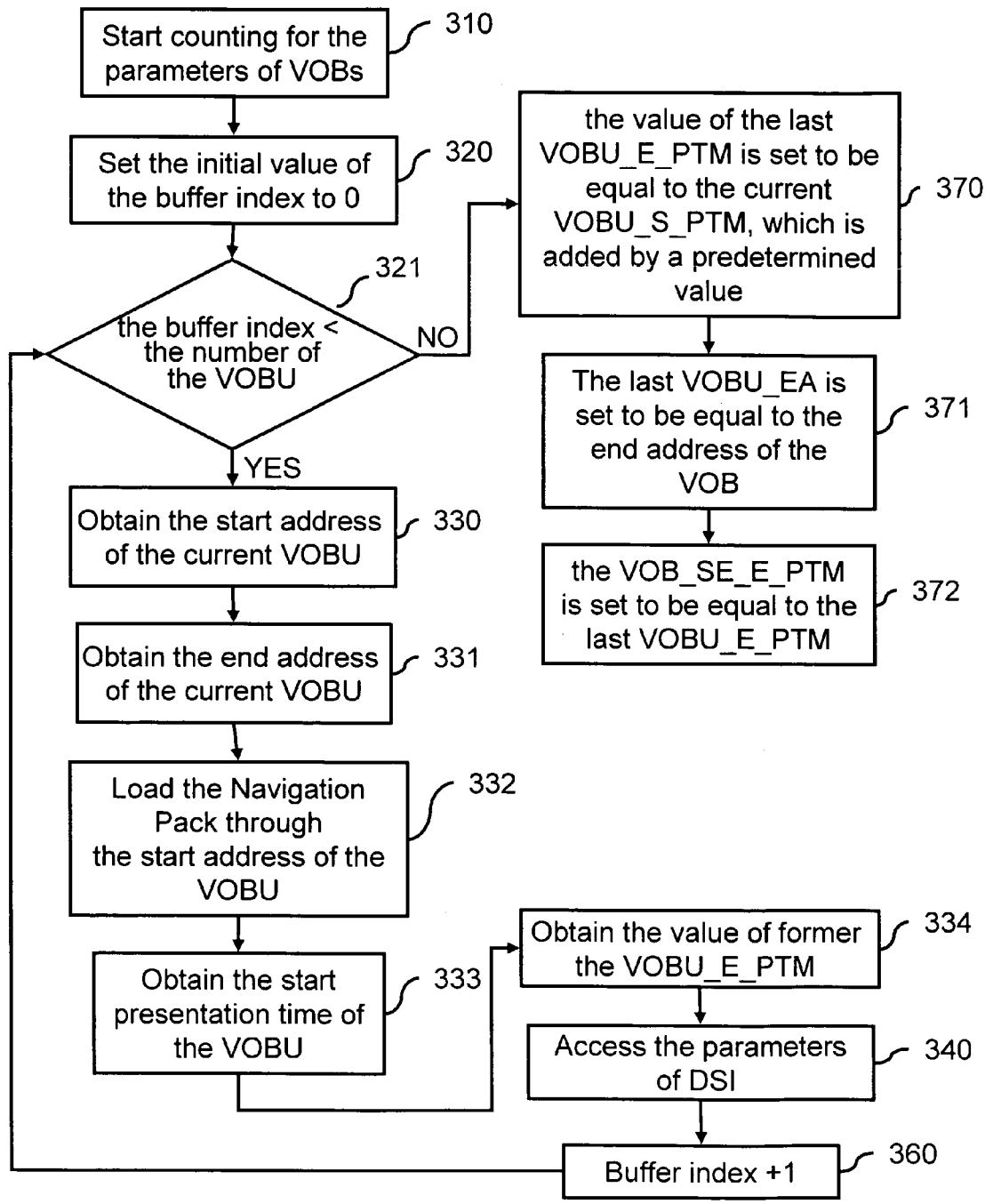
FIG. 3 illustrates the detailed flow chart of accessing the parameters needing repair in the main flow chart of the method for repairing video/audio files of multimedia video/audio disks of the invention.

In step 321 of FIG. 3, if the buffer index is greater than the number of VOBU, the value of the last VOBU_E_PTM is set to be equal to the current VOBU_S_PTM, which is added by a predetermined value, for example, 45045 (step 370). The last VOBU_EA is set to be equal to the end address of the VOB (step 371), and the VOB_SE_E_PTM is set to be equal to the last VOBU_E_PTM (step 372). Therefore, counting for accessing the parameters of VOB which includes a VOBU_E_PTM, VOBU_EA VOBU_1STREF_EA, VOBU_2NDREF_EA, VOBU_3RDREF_EA, and VOB_SE_E_PTM is finished.

After all the parameters of VOBUs that need reparation are retrieved, VOBUs are repaired.

Figure 5:
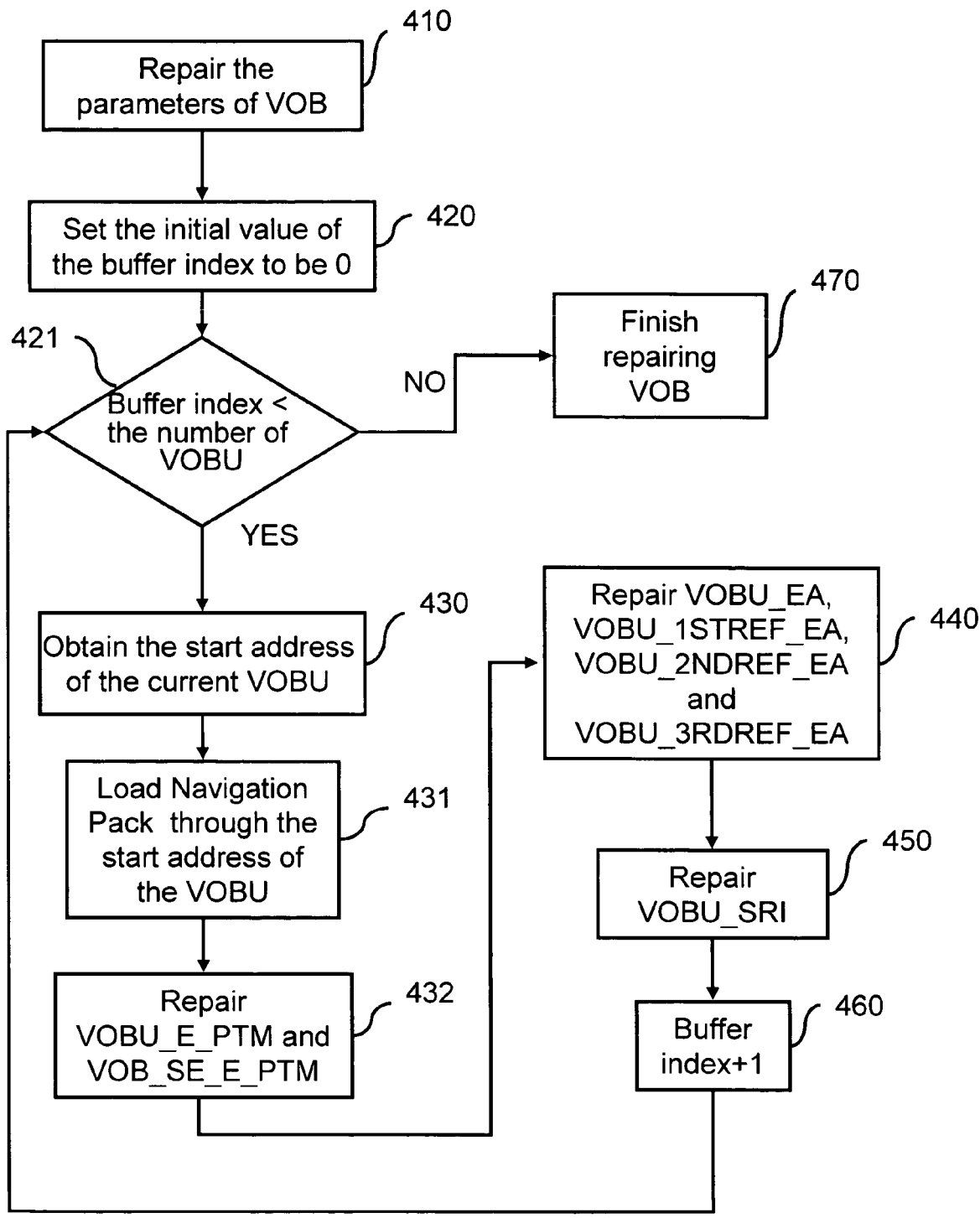
FIG. 5 illustrates the detailed flow chart of repairing parameters in the main flow chart of the method for repairing video/audio files of multimedia video/audio disks of the invention.

Refer to FIG. 5 illustrating the detailed flow chart of repairing parameters in the main flow chart of the method for repairing video/audio files of multimedia video/audio disks of the invention. The flow starts to repair the parameters of VOB (step 410), which include a VOBU_E_PTM, VOBU_EA, VOBU_1STREF_EA, VOBU_2NDREF_EA, VOBU_3RDREF_EA, VOB_SE_E_PTM and VOBU_SRI.

The flow moves to the start address of the VOBU at first, and loads the Navigation Packs. The initial value of the buffer index is set to be 0 (step 420), and judges whether the current value of the buffer index is smaller than the number of VOBUs (step 421) for making sure that all the VOBUs have been accessed. If the current value of the buffer index is greater than the number of VOBUs, repairing the VOB parameters including VOBU_E_PTM, VOBU_EA, VOBU_1STREF_EA, VOBU_2NDREF_EA, VOBU_3RDREF_EA, VOB_SE_E_PTM, and VOBU_SRI Table is finished (step 470). Then the start address of the current VOBU is obtained through the filed VTS_VOBU_ADMAP (step 430). The index value of the current VOBU is the same as the value of the current buffer index. After obtaining the start address, the Navigation Packs are then loaded through the start address of the VOBUs (step 431).

The VOBU_E_PTM in the PCI_GI of the PCI in the Navigation Pack and the VOB_SE_E_PTM are then repaired (step 432). The four parameters in the DSI_GI of the DSI in the Navigation Pack, which are the VOBU_EA, VOBU_1STREF_EA, VOBU_2NDREF_EA, and VOBU_3RDREF_EA respectively, are then repaired following step 432 (step 440). The VOBU_SRI Table is then repaired (step 450), and the buffer index is added by I (step 460). The flow then returns back to step 421, and continues the above steps until all the parameters are repaired.

Figure 6:
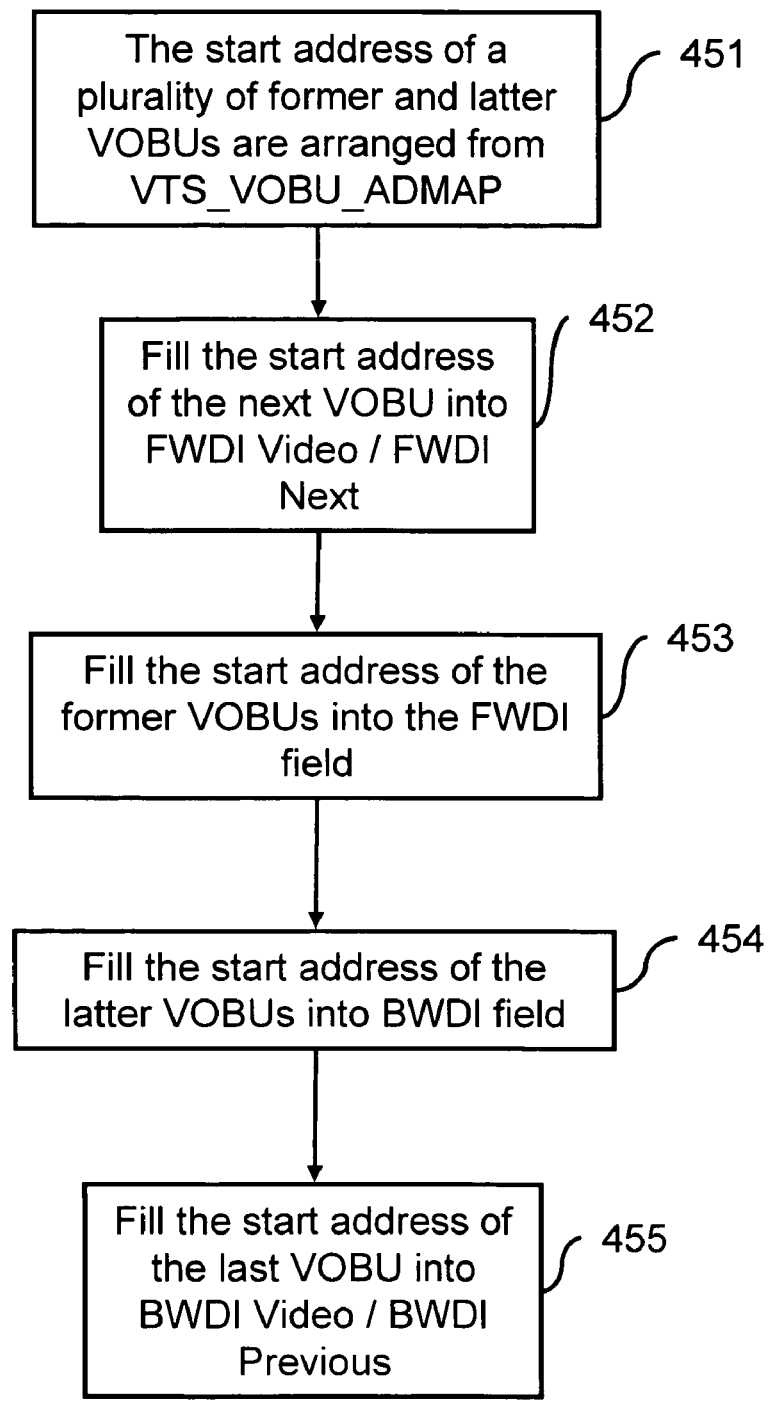
FIG. 6 illustrates the detailed flow chart of repairing VOBU_SRI Tables of DSI in the main flow chart of the method for repairing video/audio files of multimedia video/audio disks of the invention.

The VOBU_SRI Table in the DSI is then repaired. Please refer to FIG. 6 illustrating the detailed flow chart of repairing the VOBU_SRI Tables of DSI in the main flow chart of the method for repairing the video/audio files of multimedia video/audio disks of the invention. All the fields of the VOBU_SRI are generated according to the start address of all the VOBUs which are obtained from the VTS_VOBU_ADMAP.

For the current VOBU, the start address of a plurality of former and latter VOBUs is taken into consideration (step 451), for example 240. Then the fast forward/backward parameter is repaired. The start address of the next VOBU is filled into the start address of the next VOBU having video/audio data (FWDI Video) and the index indicating the existing of the next VOBU (FWDI Next) (step 452). The start address of the former VOBU is then filled into the FWDI field (step 453). The start address of the former VOBU is filled into the start address of the former VOBU having video/audio data (BWDI Video) and the index indicating the existing of the former VOBU (BWDI Previous) (step 454). The start address of the latter VOBUs is then filled into the BWDI field (step 455).

After finishing reparation, the disk drive writes the repaired Navigation Pack into the start address of the same Navigation Pack, which is not repaired, and the current Navigation Pack finishes repairing. The start address of the next VOBU is obtained through the VTS_VOBU_ADMAP such, that the drive reaches the start address of the next Navigation Pack and continues repairing the VOBU parameters until all the VOBUs are repaired. After all the VOBUs finish reparation, the VOB finishes reparation.

Figure 7:
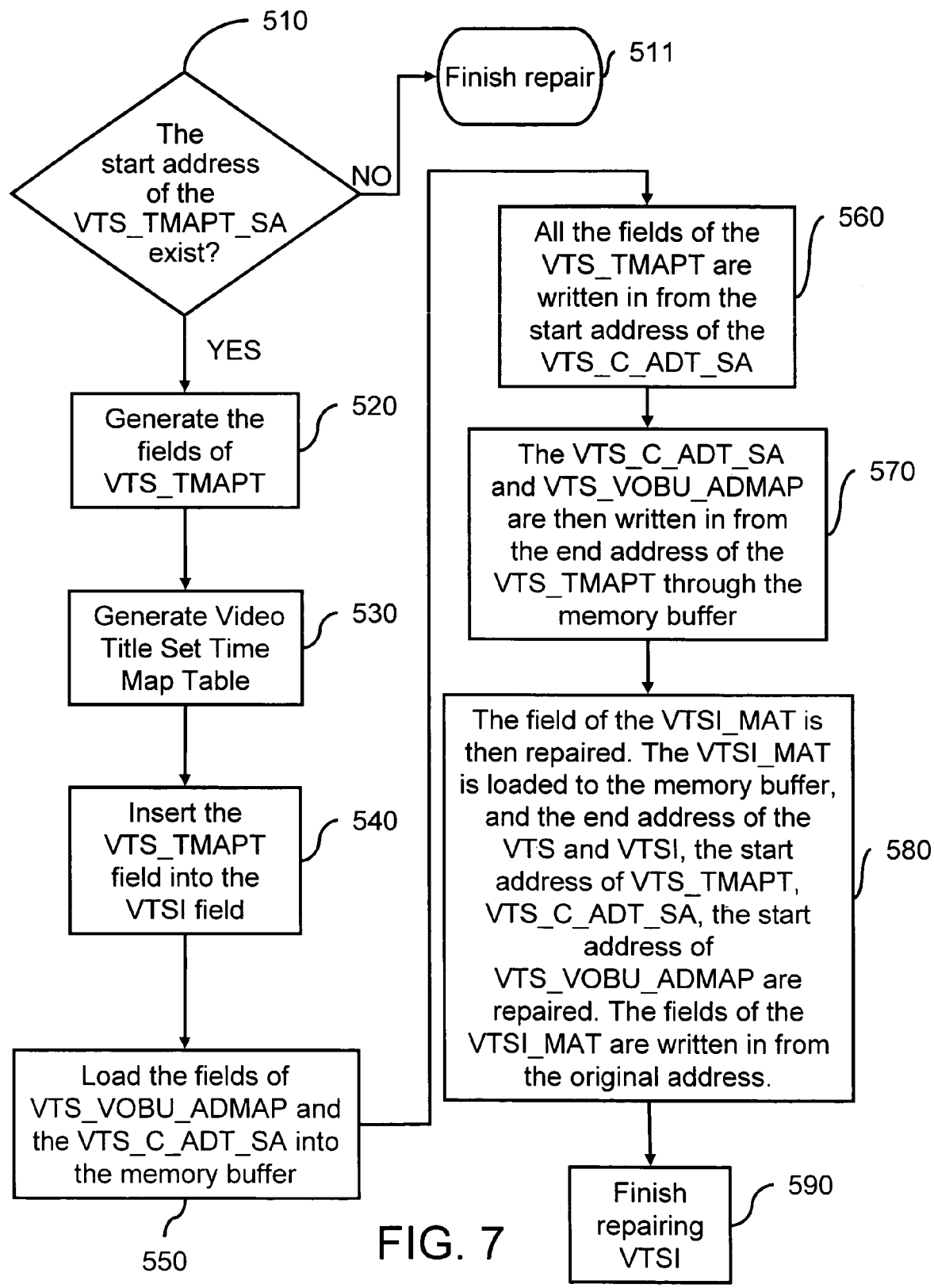
FIG. 7 illustrates the detailed flow chart of repairing VTSI in the main flow chart of the method for repairing video/audio files of multimedia video/audio disks of the invention.

After finishing repairing the VOB, the VTSI is then repaired. Please refer to FIG. 7 illustrating the detailed flow chart of repairing VTSI in the main flow chart of the method for repairing video/audio files of multimedia video/audio disks of the invention.

First, the start address of the VTS_TMAPT_SA is determined (step 510), i.e., judge whether the Video Title Set Time Map (VTS_TMAPT) exits. If the value of VTS_TMAPT_SA is 0, the parameters finish reparation (step 511). If it is not 0, the VTS_TMAPT field (step 520) and the Video Title Set Time Map Table (step 530) are generated by utilizing all the start addresss of all VOBUs.

After generating the two parameters, the VTS_TMAPT field is inserted into the VTSI field (step 540) for repairing the VTS_TMAPT_SA and the field length of the VTS_C_ADT_SA and VTS_VOBU_ADMAP_SA in the Video Title Set Information Management Table.

After repairing, the disk drive loads the fields of the Video Title Set Object Unit Address Map (VTS_VOBU_ADMAP) and the Video Title Set Cell Address Table (VTS_C_ADT_SA) to the memory buffer (step 550). All the fields of the VTS_TMAPT are written in from the start address of the VTS_C_ADT_SA (step 560). The VTS_C_ADT_SA and VTS_VOBU_ADMAP are then written in from the end address of the VTS_TMAPT through the memory buffer (step 570).

After writing, the field of the VTSI_MAT is then repaired. First, the VTSI_MAT is loaded to the memory buffer, and the end address of the VTS and VTSI, the start address of VTS_TMAPT, VTS_C_ADT_SA, the start address of VTS_VOBU_ADMAP are repaired. The fields of the VTSI_MAT are written in from the original address (step 580) for finishing repairing the VTSI (step 590).

Figure 8:
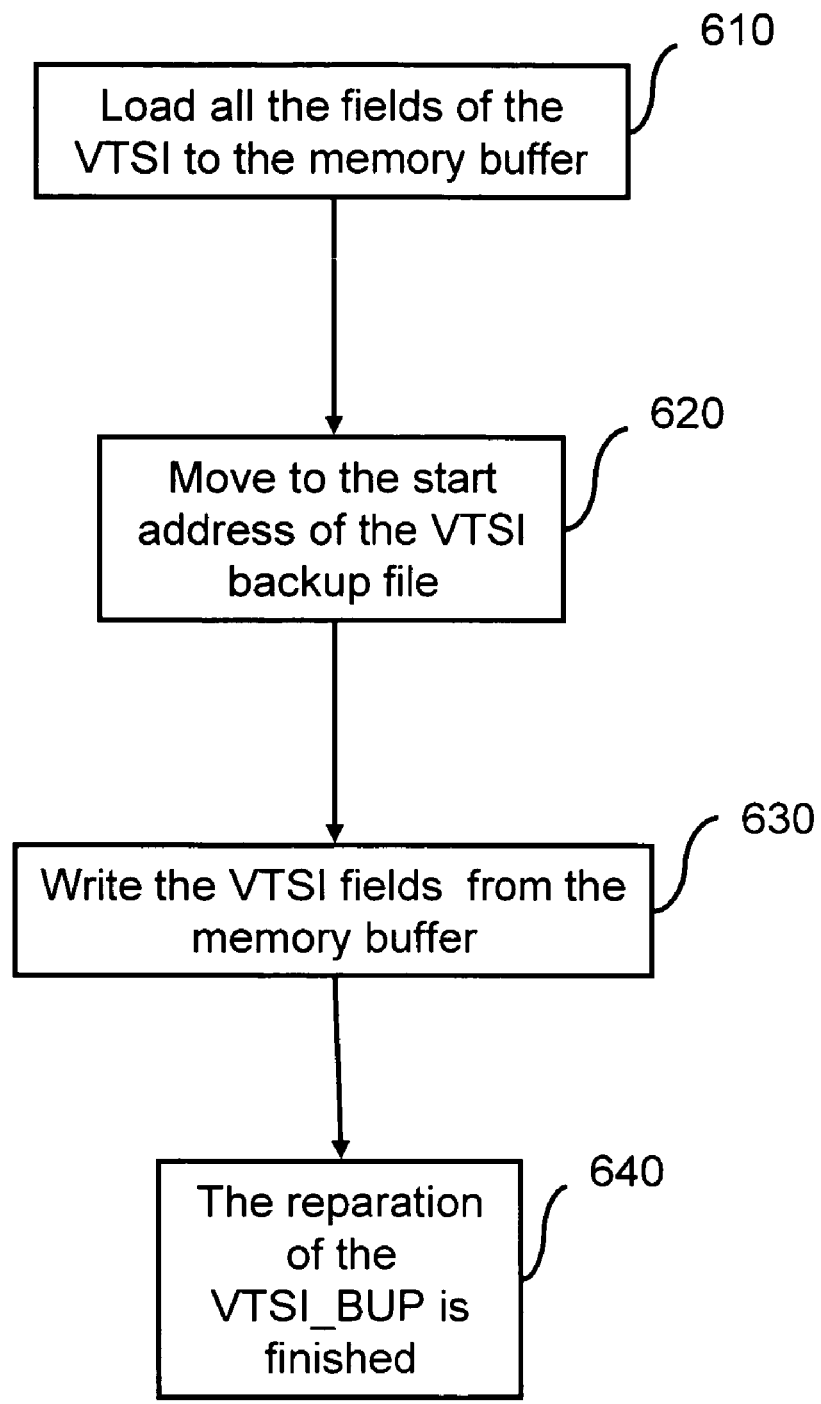
FIG. 8 illustrates the detailed flow chart of repairing backup files of VTSI in the main flow chart of the method for repairing video/audio files of multimedia video/audio disks of the invention.

All the fields of VTSI are duplicated to the VTSI backup file (VTSI_BUP). Please refer to FIG. 8. All the fields of the VTSI are loaded to the memory buffer (step 610).

The disk drive moves to the start address of the VTSI backup file (step 620) and the start address of VTSI_BUP is obtained by the VTS_EA/VTSI_EA in the VTSI_MAT.

All the VTSI fields are written into the address which the VTSI_BUP locates (step 630). After writing, the reparation of the VTSI_BUP is finished (step 640).

Figure 9:
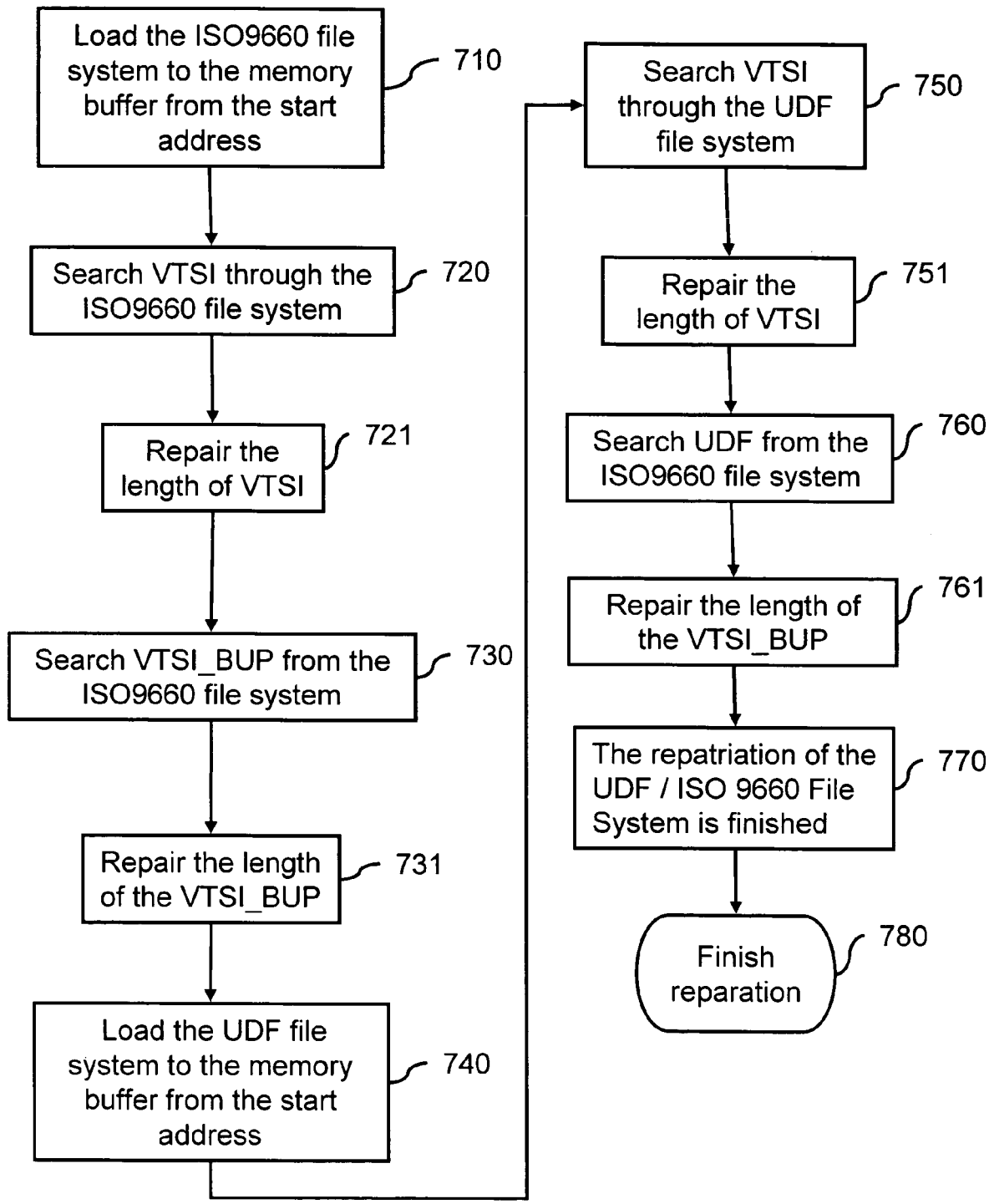
FIG. 9 illustrates the detailed flow chart of repairing file system information in the main flow chart of the method for repairing video/audio files of multimedia video/audio disks of the invention.

After repairing the above parameters, the UDF/ISO9660 file system is then repaired on the basis of the repaired parameters. Please refer to FIG. 9.

The UDF/ISO9660 file system is loaded to the memory buffer from the disk (step 710). The field of the VTSI length is obtained through the ISO9660 file system in the memory buffer (step 720). The field is repaired by the VTSI length, which VTS_TMAPT has been added (step 721). The field which the VTSI_BUP length locates is then obtained (step 730) and then the field is repaired by the VTSI length that VTS_TMAPT has been added (step 731). Accordingly, the reparation of the ISO9660 file system is finished.

The UDF file system is then repaired. The fields of UDF are accessed from the memory buffer (step 740). The address in which the VTSI field and the VTSI_BUP field are located are then obtained to repair the fields of VTSI and VTSI_BUP (step 750, 751, 760, and 761). The VTSI length in which the VTS_TMAPT has been added repairs the two fields. Accordingly, the UDF file system finishes reparation. The repaired UDF/ISO9660 file system is written onto the disk from the memory buffer, to finish repairing the UDF/ISO 9660 File System (step 770). Accordingly, the DVD disk finishes reparation (step 780).

The method of the invention may be applied in, for example, rewritable DVD+RW optical disks. In DVD instantaneous video/audio editing and recording platforms, the recorded files are repaired after recording.

The disk drive first accesses all the necessary values of the navigation packs of the VOBs through scanning the whole disk. Then, the drive writes the correct values into the related fields that have incorrect values when performing instantaneous editing and recording. Through the above procedures, the recorded films may play normally, fast forward, backward smoothly and show correct presentation time.

According to the method of the invention, the errors caused by the video/audio instantaneous editing and recording platform may be reduced such, that the repaired films play fast forward/backward smoothly, perform a Time Search function accurately, display presentation time correctly, and are compatible to players of different specifications.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A method for repairing video/audio files of multimedia video/audio disks, for repairing a fast forward/backward parameter and a presentation time display parameter of a video/audio file recorded by a video/audio instantaneous editing and recording platform, comprising steps of:

accessing a file system from the video/audio disk and a Video Manager Information and a Video Title Set Information of the file system for obtaining an address of the fast forward/backward parameter and the presentation time display parameter;

accessing all Video Object Units in the video/audio file and the fast forward/backward parameter and the presentation time display parameter that needing repaired from all the Video Object Units in the video/audio file according to the obtained address, the step of accessing all the Video Object Units comprising steps of:

obtaining the start address and the end address of the current Video Object Unit;

loading the Navigation Packs of the Video Object Unit from the start address for obtaining the start time of the current Video Object Unit and the end time of the former Video Object Unit;

setting the end time of the last Video Object Unit to be as the end time of the former Video Object Unit added by a predetermined value;

setting the end address of the last Video Object Unit to be the end address of the Video Object; and setting the end presentation time of sequence end in the Video Object Unit to be the end address of the last Video Object Unit;

repairing the fast forward/backward parameter and the presentation time display parameter; and repairing the file system according to the repaired fast forward/backward parameter and the repaired presentation time display parameter.

2. The method of claim 1, wherein the step of accessing the file system further comprises steps of:

loading the file system to a memory buffer, and searching the start address of the file system;

searching the start address of the Video Manager Information according to the start address of the file system;

loading the Video Manager Information according to the start address of the Video Manager Information;

searching a Title Search Pointer from the Video Manager Information;

searching the start address of the Video Title Set Information according to the Title Search Pointer;

loading the Video Title Set Information to the memory buffer;

searching the start address of Video Title Information Management Table according to the Video Title Set Information;

obtaining the start address of Video Title Set Video Object Unit Address Map according to the Video Title Information Management Table;

loading the Video Title Set Video Object Unit Address Map from the start address of the Video Title Set Video Object Unit Address Map; and obtaining the start address of all the Video Object Units and the number of the Video Object Units according to the Video Title Set Video Object Unit Address Map.

3. The method of claim 1, wherein further comprises a step of accessing Data Search Information.

4. The method of claim 3, wherein the step of accessing Data Search Information further comprises steps of:
  loading packs from the Video Object Unit;
  assuring whether the pack is the first reference picture and obtaining the end address of the first reference picture;
  assuring whether the pack is the second reference picture and obtaining the end address of second reference picture; and
  assuring whether the pack is the third reference picture and obtaining the end address of the third reference picture.

5. The method of claim 1, wherein the step of repairing the fast forward/backward parameter and the presentation time display parameter further comprises steps of:
  obtaining the start address and the end address of the current Video Object Unit;
  loading the Navigation Packs of the Video Object Unit from the start address of the current Video Object Unit;
  repairing the end time of the Video Object Unit and the end presentation time of sequence end in the Video Object Unit;
  repairing the end address of the Video Object Unit and the end address of the first, second, and third reference picture; and
  repairing the Search Information of the Video Object Unit.

6. The method of claim 5, wherein the step of repairing the fast forward/backward parameter and the presentation time display parameter further comprises steps of:
  obtaining the start address of a plurality of the former and the latter of the Video Object Units from the current Video Title Set Video Object Unit Address Map;
  filling the start address of the next Video Object Unit from the current Video Object Unit into the fast forward/backward parameter; and
  filling the start address of the former Video Object Unit from the current Video Object Unit into the fast forward/backward parameter.

7. The method of claim 5, wherein the step of repairing the fast forward/backward parameter and the presentation time display parameter further comprises steps of:
  assuring whether a Video Title Set Time Map exist;
  generating the Video Title Set Time Map and the fields of the Video Title Set Time Map when the Video Title Set Time Map exit;
  inserting the fields of the Video Title Set Time Map into Video Title Information;
  loading the Video Title Set Cell Address Table and Video Title Set Video Object Unit Address Map according to the Video Title Information;
  writing the Video Title Set Time Map into the Video Title Set Cell Address Table;
  writing the Video Title Information into the Video Title Set Cell Address Table and Video Title Set Video Object Unit Address Map from the end address of the Video Title Set Time Map; and
  loading Video Title Information Management Table and repairing the start address and the end address of the fields in the table.

8. The method of claim 7, wherein the step of repairing the fast forward/backward parameter and the presentation time display parameter further comprises steps of:
  loading the Video Title Information to the memory buffer;
  moving to the start address of the Video Title Information backup file; and
  writing the Video Title Information to the Video Title Information backup file from the memory buffer.

9. The method of claim 1, wherein the step of repairing the file system further comprises steps of:
  loading the file system from the start address of the file system;
  searching the Video Title Information in the file system;
  repairing the Video Title Information in the file system;
  searching the Video Title Information backup file in the file system; and
  repairing the Video Title Information backup file in the file system.

10. A method for repairing video/audio files of multimedia video/audio disks, for repairing a fast forward/backward parameter and a presentation time display parameter of a video/audio file recorded by a video/audio instantaneous editing and recording platform, comprising steps of:
  accessing a file system from the video/audio disk and a Video Manager Information and a Video Title Set Information of the file system for obtaining an address of the fast forward/backward parameter and the presentation time display parameter;
  accessing all Video Object Units in the video/audio file and the fast forward/backward parameter and the presentation time display parameter that needing repaired from all the Video Object Units in the video/audio file according to the obtained address;
  repairing the fast forward/backward parameter and the presentation time display parameter, the step of repairing the fast forward/backward parameter and the presentation time display parameter comprising steps of:
    obtaining the start address and the end address of the current Video Object Unit;
    loading the Navigation Packs of the Video Object Unit from the start address of the current Video Object Unit;
    repairing the end time of the Video Object Unit and the end presentation time of sequence end in the Video Object Unit;
    repairing the end address of the Video Object Unit and the end address of the first, second, and third reference picture; and
    repairing the Search Information of the Video Object Unit; and
  repairing the file system according to the repaired fast forward/backward parameter and the repaired presentation time display parameter.

11. The method of claim 10, wherein the step of accessing the file system further comprises steps of:
  loading the file system to a memory buffer, and searching the start address of the file system;
  searching the start address of the Video Manager Information according to the start address of the file system;
  loading the Video Manager Information according to the start address of the Video Manager Information;
  searching a Title Search Pointer from the Video Manager Information;
  searching the start address of the Video Title Set Information according to the Title Search Pointer;
  loading the Video Title Set Information to the memory buffer;
  searching the start address of Video Title Information Management Table according to the Video Title Set Information;
  obtaining the start address of Video Title Set Video Object Unit Address Map according to the Video Title Information Management Table;
  loading the Video Title Set Video Object Unit Address Map from the start address of the Video Title Set Video Object Unit Address Map; and obtaining the start address of all the Video Object Units and the number of the Video Object Units according to the Video Title Set Video Object Unit Address Map.

12. The method of claim 10, wherein the step of accessing all the Video Object Units in the video/audio file further comprises steps of:
obtaining the start address and the end address of the current Video Object Unit;
loading the Navigation Packs of the Video Object Unit from the start address for obtaining the start time of the current Video Object Unit and the end time of the former Video Object Unit;
setting the end time of the last Video Object Unit to be as the end time of the former Video Object Unit added by a predetermined value;
setting the end address of the last Video Object Unit to be the end address of the Video Object; and
setting the end presentation time of sequence end in the Video Object Unit to be the end address of the last Video Object Unit.

13. The method of claim 12, wherein further comprises a step of accessing Data Search Information.

14. The method of claim 13, wherein the step of accessing Data Search Information further comprises steps of:
loading packs from the Video Object Unit;
assuring whether the pack is the first reference picture and obtaining the end address of the first reference picture;
assuring whether the pack is the second reference picture and obtaining the end address of second reference picture; and
assuring whether the pack is the third reference picture and obtaining the end address of the third reference picture.

15. The method of claim 10, wherein the step of repairing the fast forward/backward parameter and the presentation time display parameter further comprises steps of:
obtaining the start address of a plurality of the former and the latter of the Video Object Units from the current Video Title Set Video Object Unit Address Map;
filling the start address of the next Video Object Unit from the current Video Object Unit into the fast forward/backward parameter; and
filling the start address of the former Video Object Unit from the current Video Object Unit into the fast forward/backward parameter.

16. The method of claim 10, wherein the step of repairing the fast forward/backward parameter and the presentation time display parameter further comprises steps of:
assuring whether a Video Title Set Time Map exist;
generating the Video Title Set Time Map and the fields of the Video Title Set Time Map when the Video Title Set Time Map exit;
inserting the fields of the Video Title Set Time Map into Video Title Information;
loading the Video Title Set Cell Address Table and Video Title Set Video Object Unit Address Map according to the Video Title Information;
writing the Video Title Set Time Map into the Video Title Set Cell Address Table;
writing the Video Title Information into the Video Title Set Cell Address Table and Video Title Set Video Object Unit Address Map from the end address of the Video Title Set Time Map; and
loading Video Title Information Management Table and repairing the start address and the end address of the fields in the table.

17. The method of claim 16, wherein the step of repairing the fast forward/backward parameter and the presentation time display parameter further comprises steps of:
loading the Video Title Information to the memory buffer;
moving to the start address of the Video Title Information backup file; and
writing the Video Title Information to the Video Title Information backup file from the memory buffer.

18. The method of claim 10, wherein the step of repairing the file system further comprises steps of:
loading the file system from the start address of the file system;
searching the Video Title Information in the file system;
repairing the Video Title Information in the file system;
searching the Video Title Information backup file in the file system; and
repairing the Video Title Information backup file in the file system.

19. A method for repairing video/audio files of multimedia video/audio disks, for repairing a fast forward/backward parameter and a presentation time display parameter of a video/audio file recorded by a video/audio instantaneous editing and recording platform, comprising steps of:
accessing a file system from the video/audio disk and a Video Manager Information and a Video Title Set Information of the file system for obtaining an address of the fast forward/backward parameter and the presentation time display parameter;
accessing all Video Object Units in the video/audio file and the fast forward/backward parameter and the presentation time display parameter that needing repaired from all the Video Object Units in the video/audio file according to the obtained address;
repairing the fast forward/backward parameter and the presentation time display parameter; and
repairing the file system according to the repaired fast forward/backward parameter and the repaired presentation time display parameter, the step of repairing the file system comprising steps of:
loading the file system from the start address of the file system;
searching Video Title Information in the file system;
repairing the Video Title Information in the file system;
searching the Video Title Information backup file in the file system; and
repairing the Video Title Information backup file in the file system.

20. The method of claim 19, wherein the step of accessing the file system further comprises steps of:
loading the file system to a memory buffer, and searching the start address of the file system;
searching the start address of the Video Manager Information according to the start address of the file system;
loading the Video Manager Information according to the start address of the Video Manager Information;
searching a Title Search Pointer from the Video Manager Information;
searching the start address of the Video Title Set Information according to the Title Search Pointer;
loading the Video Title Set Information to the memory buffer;
searching the start address of Video Title Information Management Table according to the Video Title Set Information;
obtaining the start address of Video Title Set Video Object Unit Address Map according to the Video Title Information Management Table;

loading the Video Title Set Video Object Unit Address Map from the start address of the Video Title Set Video Object Unit Address Map; and obtaining the start address of all the Video Object Units and the number of the Video Object Units according to the Video Title Set Video Object Unit Address Map.

21. The method of claim 19, wherein the step of accessing all the Video Object Units in the video/audio file further comprises steps of:

obtaining the start address and the end address of the current Video Object Unit;

loading the Navigation Packs of the Video Object Unit from the start address for obtaining the start time of the current Video Object Unit and the end time of the former Video Object Unit;

setting the end time of the last Video Object Unit to be as the end time of the former Video Object Unit added by a predetermined value;

setting the end address of the last Video Object Unit to be the end address of the Video Object; and setting the end presentation time of sequence end in the Video Object Unit to be the end address of the last Video Object Unit.

22. The method of claim 21, wherein further comprises a step of accessing Data Search Information.

23. The method of claim 22, wherein the step of accessing Data Search Information further comprises steps of:

loading packs from the Video Object Unit;

assuring whether the pack is the first reference picture and obtaining the end address of the first reference picture;

assuring whether the pack is the second reference picture and obtaining the end address of second reference picture; and assuring whether the pack is the third reference picture and obtaining the end address of the third reference picture.

24. The method of claim 19, wherein the step of repairing the fast forward/backward parameter and the presentation time display parameter further comprises steps of:

obtaining the start address and the end address of the current Video Object Unit;

loading the Navigation Packs of the Video Object Unit from the start address of the current Video Object Unit;

repairing the end time of the Video Object Unit and the end presentation time of sequence end in the Video Object Unit;

repairing the end address of the Video Object Unit and the end address of the first, second, and third reference picture; and repairing the Search Information of the Video Object Unit.

25. The method of claim 24, wherein the step of repairing the fast forward/backward parameter and the presentation time display parameter further comprises steps of:

obtaining the start address of a plurality of the former and the latter of the Video Object Units from the current Video Title Set Video Object Unit Address Map;

filling the start address of the next Video Object Unit from the current Video Object Unit into the fast forward/backward parameter; and filling the start address of the former Video Object Unit from the current Video Object Unit into the fast forward/backward parameter.

26. The method of claim 24, wherein the step of repairing the fast forward/backward parameter and the presentation time display parameter further comprises steps of:

assuring whether a Video Title Set Time Map exist;

generating the Video Title Set Time Map and the fields of the Video Title Set Time Map when the Video Title Set Time Map exit;

inserting the fields of the Video Title Set Time Map into Video Title Information;

loading the Video Title Set Cell Address Table and Video Title Set Video Object Unit Address Map according to the Video Title Information;

writing the Video Title Set Time Map into the Video Title Set Cell Address Table;

writing the Video Title Information into the Video Title Set Cell Address Table and Video Title Set Video Object Unit Address Map from the end address of the Video Title Set Time Map; and loading Video Title Information Management Table and repairing the start address and the end address of the fields in the table.

27. The method of claim 26, wherein the step of repairing the fast forward/backward parameter and the presentation time display parameter further comprises steps of:

loading the Video Title Information to the memory buffer;

moving to the start address of the Video Title Information backup file; and writing the Video Title Information to the Video Title Information backup file from the memory buffer.

* * * * *